US007840610B2

United States Patent
Chandrasekharan et al.

(10) Patent No.: US 7,840,610 B2
(45) Date of Patent: Nov. 23, 2010

(54) APPARATUS, SYSTEM, AND METHOD FOR MAP DEFINITION GENERATION

(75) Inventors: Sivakumar Chandrasekharan, Alameda, CA (US); Karthikeyan Chelladurai, Dublin, CA (US); Saravanakumar Anthiyur Srinivasan, Fremont, CA (US); Juliana Hing Sze Tsang, San Lorenzo, CA (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 11/127,344

(22) Filed: May 11, 2005

(65) Prior Publication Data

US 2006/0259470 A1 Nov. 16, 2006

(51) Int. Cl.
*G06F 7/00* (2006.01)
(52) U.S. Cl. ..................................... 707/809
(58) Field of Classification Search ................. None
See application file for complete search history.

(56) References Cited

U.S. PATENT DOCUMENTS

| | | | | |
|---|---|---|---|---|
| 5,251,314 | A | | 10/1993 | Williams ................ 395/600 |
| 5,392,390 | A | * | 2/1995 | Crozier .................. 715/751 |
| 5,448,726 | A | * | 9/1995 | Cramsie et al. ......... 707/103 R |
| 5,715,468 | A | * | 2/1998 | Budzinski ................ 704/9 |
| 5,724,575 | A | * | 3/1998 | Hoover et al. ............ 707/10 |
| 6,009,436 | A | * | 12/1999 | Motoyama et al. ........ 706/59 |
| 6,029,178 | A | | 2/2000 | Martin et al. ............ 707/201 |
| 6,154,748 | A | | 11/2000 | Gupta et al. ............. 707/102 |
| 6,163,776 | A | * | 12/2000 | Periwal .................. 707/4 |
| 6,260,044 | B1 | * | 7/2001 | Nagral et al. ............ 707/102 |
| 6,295,541 | B1 | | 9/2001 | Bodnar et al. ............ 707/203 |
| 6,295,542 | B1 | | 9/2001 | Corbin .................. 707/501.1 |
| 6,339,775 | B1 | * | 1/2002 | Zamanian et al. ........ 707/101 |
| 6,523,042 | B2 | | 2/2003 | Milleker et al. .......... 707/102 |
| 6,535,892 | B1 | | 3/2003 | LaRue et al. ............ 707/203 |
| 6,542,901 | B1 | | 4/2003 | Devine et al. ........... 707/104.1 |
| 6,687,873 | B1 | | 2/2004 | Ballantyne et al. ........ 715/500 |
| 6,694,338 | B1 | * | 2/2004 | Lindsay ................. 707/203 |
| 6,718,320 | B1 | * | 4/2004 | Subramanian et al. ..... 707/719 |
| 6,757,739 | B1 | * | 6/2004 | Tomm et al. ............ 709/236 |
| 6,853,997 | B2 | * | 2/2005 | Wotring et al. .......... 707/756 |
| 7,016,963 | B1 | * | 3/2006 | Judd et al. .............. 709/228 |
| 7,149,746 | B2 | * | 12/2006 | Fagin et al. ............. 707/756 |

(Continued)

OTHER PUBLICATIONS

IBM WebSphere Business Integration Server Express and Express Plus "Map Development Guide"; Version 4.4; Apr. 22, 2005; IBM Corp.; pp. 25, 66, 67, 68.*

(Continued)

*Primary Examiner*—Neveen Abel Jalil
*Assistant Examiner*—Christyann R Pulliam
(74) *Attorney, Agent, or Firm*—Kunzler Needham Massey & Thorpe

(57) ABSTRACT

A computer program product, apparatus, system, and method are disclosed for automatic generation of a map definition. The computer program product performs operations for such generation. These operations include identifying a source data structure and a source attribute associated with the source data structure and identifying a destination data structure and a destination attribute associated with the destination data structure. These operations also include automatically identifying a match of the source attribute and the destination attribute and generating a map definition inclusive of the match. The computer program product, apparatus, system, and method thereby reduce human intervention in the creation of a map definition.

30 Claims, 8 Drawing Sheets

U.S. PATENT DOCUMENTS

| | | | |
|---|---|---|---|
| 7,313,575 B2* | 12/2007 | Carr et al. | 707/104.1 |
| 7,444,330 B2* | 10/2008 | Bernstein et al. | 707/6 |
| 7,725,433 B1* | 5/2010 | Labrie | 707/612 |
| 2001/0005849 A1* | 6/2001 | Boothby et al. | 707/1 |
| 2002/0099735 A1 | 7/2002 | Schroeder et al. | 707/513 |
| 2003/0088543 A1 | 5/2003 | Skeen et al. | 707/1 |
| 2003/0208505 A1* | 11/2003 | Mullins et al. | 707/102 |
| 2004/0098663 A1 | 5/2004 | Rey et al. | 715/500 |
| 2004/0122852 A1* | 6/2004 | Charters | 707/102 |
| 2005/0257193 A1* | 11/2005 | Falk et al. | 717/109 |

OTHER PUBLICATIONS

Milo et al. "Using Schema Matching to Simplify Hetreogeneous Data Translation" Computer Science Dept. Tel-Aviv University Proceedings of the 24$^{th}$ VLDB Conference New York, USA 1998.*

Haas et al. "Transforming Heterogeneous Data with Databse Middleware: Beyond Integration" Bulletin of the IEEE Computer Society Technical Committee on Data Engineering. 1997.*

IBM WebSphere Business Integration Server Express and Express Plus "Map Development Guide"; Version 4.4 pp. 65-72, Apr. 22, 2005.

"IBM WebSphere Business Integration Toolset"; http://www-306.ibm.com/software/integration/wbitools/library/faq-tools.html, Nov. 24, 2004.

"IBM Map Designer"; http://www-306.ibm.com/software/integration/wbitools/map, Feb. 11, 2005.

"Using Map Automation"; http://publib.boulder.ibm.com/infocenter/wbihelp/topic/com.ibm.wics_developer.doc/doc/map_dev/mapdev32, Feb. 11, 2005.

Internet Archive Wayback Machine, http://web.archive.org, search / http://www-306.ibm.com/software/integration/wbitools/library/faq-tools.html; searched on Dec. 29, 2008.

"Method to Perform Complex Data Transformations in Preparation for Enterprise Integration"; RD n455, Article 130, p. 838; May 2001.

IBM WebSphere Business Integration Server Express and Express Plus "Map Development Guide"; Version 4.4 pp. 65-72, (Apr. 22, 2005).

French, Bill. "Enterprise Integration Modeling"; ActionLINE, Jan./Feb. 2002 pp. 26-28.

"IBM WebSphere Business Integration Toolset"; http://www-306.ibm.com/software/integration/wbitools/library/faq-tools.html, (2004).

"IBM Map Designer"; http://www-306.ibm.com/software/integration/wbitools/map, (retrieved Feb. 11, 2005).

"Using Map Automation"; http://publib.boulder.ibm.com/infocenter/wbihelp/topic/com.ibm.wics_developer.doc/doc/map_dev/mapdev32, (2004).

* cited by examiner

APPARATUS, SYSTEM, AND METHOD FOR MAP DEFINITION GENERATION

FIELD OF ART

This invention relates to data mapping and more particularly relates to automatically creating a map definition between data structures.

BACKGROUND TECHNOLOGY

One of the fundamental challenges in enterprise application integration is enabling smooth data flow between disparate applications. Data structure formats used by different applications are mostly unique to each application. Therefore, data mapping is often used in the integration process of transferring information between different applications. Data mapping is a process of transforming data from one application-specific format to another.

Conventional mapping techniques allow users to manually map data of one data structure to another data structure. Typical products available in the market that facilitate such mapping transformations are achieved using graphical mapping tools that allow the user to view the individual data attributes within each data structure. However, when large data structures are encountered with hundreds of attributes, the manual process can be very time-consuming and often frustrating.

Additionally, the manual mapping techniques, even when facilitated by graphical representations of each data structure, are subject to several disadvantages. One of the common disadvantages of conventional mapping techniques is the human involvement. Human intervention introduces the probability of human error in the mapping process. Human involvement also costs significant time and money. While some level of human involvement may present certain advantages, the human involvement in conventional mapping techniques is more demanding that it needs to be, especially for trivial mappings.

Another disadvantage of conventional mapping techniques is apparent in the creation of a reverse map. A reverse map is a compliment to a forward map. For example, where the forward map is intended to transform data from a first data structure into a usable form for a second data structure, the reverse map is intended to transform data from the second structure into a usable form for the first data structure (in the reverse direction). Unfortunately, conventional reverse data mapping techniques include starting the mapping all over again. In other words, after someone has manually created a forward map, they subsequently perform the manual process all over again in the reverse direction to create the reverse map for the same data structures.

Though the format of the data structures on disparate systems may be different, the names used for defining the attributes of each data structure are often the same or similar. For example, a customer record may have the name of the customer represented in one way or other. It could be split as 'lastname, firstname' or it may occur as 'FullName' or just as 'Name'. In one way or another, though, the corresponding attributes can likely be found between the source and the destination data structures. The source data structure is the one to be transformed. The destination data structure is the one that is generated or populated with data from the source data structure.

Conventionally, a user visually scans both the source and the destination data structures (e.g. using a graphical mapping tool) and manually maps the data attributes from both data structures that the user wants to transfer. When dealing with data structures that have thousands of data attributes, this process can be alarmingly time consuming even if the mappings are for similarly or even identically named data attributes. This is because the conventional mapping techniques are dependent on manual intervention even for the most obvious transformations.

Another conventional mapping technique involves algorithms that perform mapping during runtime. In other words, data is transformed from one data format to another data format during runtime as needed. Such transformations do not actually refer to a map, but rather are performed individually according to an algorithm and a domain-based vocabulary dictionary. Unfortunately, the runtime mapping implementations do not take into account the specific features of various data structures. Instead, the runtime mapping implementations use a predefined set of terms and rules regarding how to treat different terms.

From the foregoing discussion, it should be apparent that a need exists for an apparatus, system, and method that overcome the limitations of conventional data mapping technologies. In particular, such an apparatus, system, and method would beneficially reduce the human involvement. Additionally, such an apparatus, system, and method would beneficially facilitate reverse mapping without requiring manual replication of the manual forward mapping operations.

SUMMARY

The several embodiments of the present invention have been developed in response to the present state of the art, and in particular, in response to the problems and needs in the art that have not yet been fully solved by currently available data mapping systems. Accordingly, the present invention has been developed to provide an apparatus, system, and method for automatically facilitating the creation of a map definition that overcome many or all of the above-discussed shortcomings in the art.

The apparatus to facilitate automatic generation of a map definition is provided with a logic unit containing a plurality of modules configured to functionally execute the necessary operations for automatic generation of the map definition. These modules in the described embodiments include a source module, a destination module, a match module, and a generation module. Further embodiments include an affix module, a case module, a type module, a synonym module, and a reverse module.

A system of the present invention is also presented to facilitate automatic generation of a map definition. The system may be embodied in a data communication system including a source database server and a destination database server coupled together by an interchange server.

A signal bearing medium is also presented to store a program that, when executed, performs operations to facilitate automatic generation of a map definition. In one embodiment, the operations include identifying a source data structure and a source attribute associated with the source data structure, identifying a destination data structure and a destination attribute associated with the destination data structure, automatically identifying a match of the source attribute and the destination attribute, and generating a map definition inclusive of the match.

In another embodiment, the operations may include generating the map definition during development time and identifying the match according to a tolerance parameter, which may include an affix parameter, a case sensitivity parameter, and/or a data type compatibility parameter. In another embodiment, the operations may include designating the affix parameter, the case sensitivity parameter, and/or a data type compatibility parameter.

In another embodiment, the operations may include generating a reverse map definition, including a reverse transformation, from the mapping defined in the map definition and generating a compiled reverse map definition from the reverse map definition. Exemplary reverse transformations include join and split operations. In another embodiment, the operations may include identifying the match according to a comparison of a destination attribute identifier and a synonym of a source attribute identifier, searching a synonym table for the synonym, and/or generating a compiled map definition from the map definition.

A method is also presented for generating a map definition. In one embodiment, the method includes operations that are substantially similar to the operations performed by the execution of the machine readable instructions associated with the computer program product.

In another embodiment, a service method is presented for generating a map definition for a client. The method includes accessing a source data structure and a destination data structure of a client, using a map apparatus to automatically identify a match of the source attribute and the destination attribute and to generate a map definition configured to map a source value for the identified source attribute to a destination value for the identified destination attribute, and delivering the map definition to the client. In a further embodiment, the service method may include generating the map definition during a development time, comparing the spelling of the source value to the spelling of the destination value, and editing the map definition to define a mapping between an additional source attribute and an additional destination attribute. The additional source and destination attributes may have a semantic relationship.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
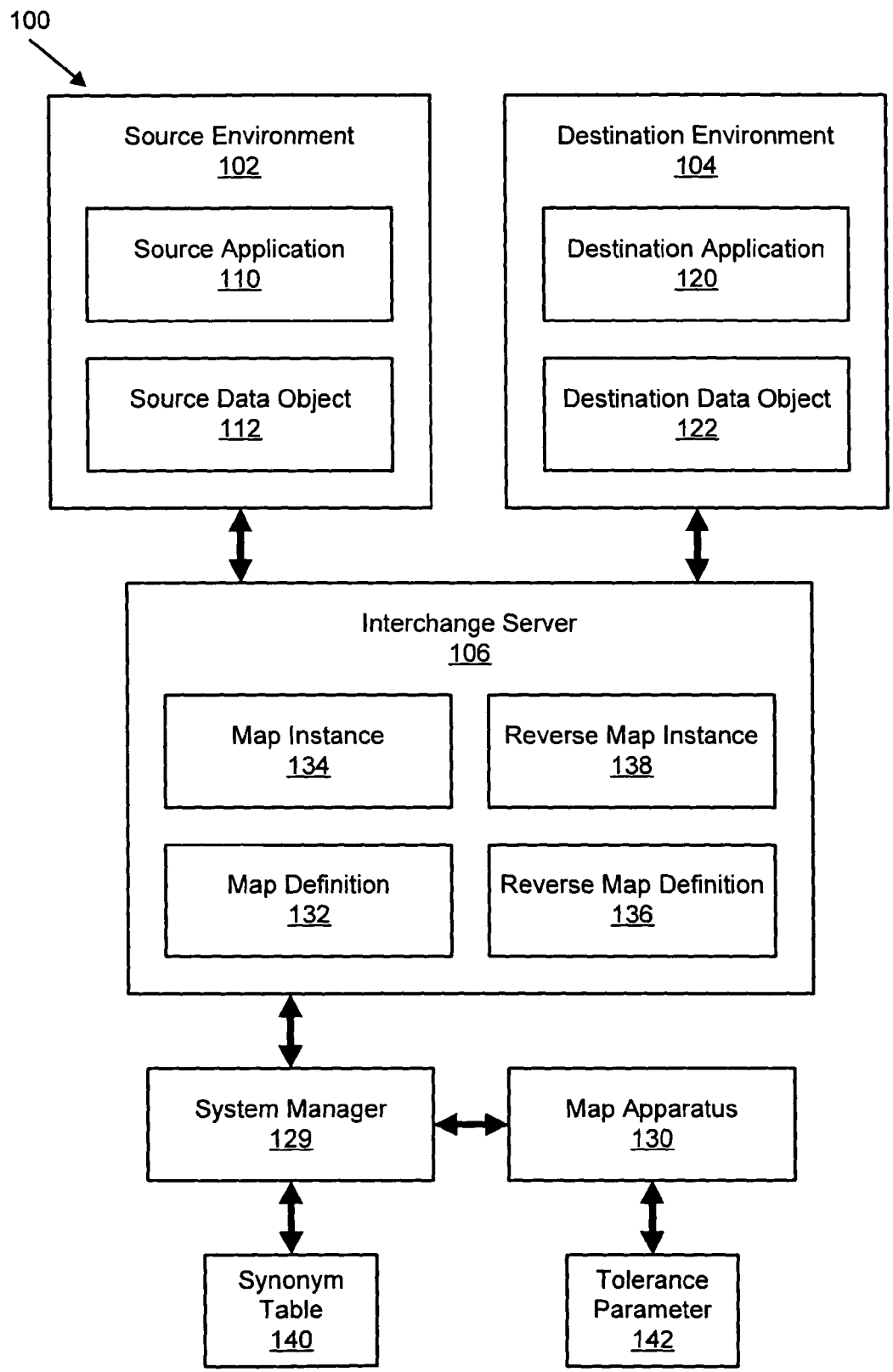
FIG. 1 is a schematic block diagram illustrating one embodiment of a data mapping system.

FIG. 1 depicts one embodiment of a data mapping system 100. The illustrated data mapping system 100 includes a source environment 102, a destination environment 104, and an interchange server 106. The source environment 102 is representative of a host computer or other network node that runs a source application 110. In one embodiment, the source environment 102 includes a source database server. The source application 110 is accompanied by a source data structure 112. The source data structure 112 may be stored on the same machine as the source application 110 or may be stored on another machine coupled to the source application 110 within the source environment 102.

The destination environment 104 is representative of a host computer or other network node that runs a destination application 120. In one embodiment, the destination environment 104 includes a destination database server. The destination application 120 is accompanied by a destination data structure 122. The destination data structure 122 may be stored on the same machine as the destination application 120 or may be stored on another machine coupled to the destination application 120 within the destination environment 104.

The interchange server 106 is coupled to both the source environment 102 and the destination environment 104. In one embodiment, the interchange server 106 may be connected to the source environment 102 and destination environment 104 via a local area network (LAN), a wide area network (WAN), a wireless network, or another conventional communication channel.

The illustrated interchange server 106 includes a map definition 132, and a map instance 134. The illustrated interchange server 106 also includes a reverse map definition 136, and a reverse map instance 138.

In one embodiment, the map definition 132 serves as a template or description of the map instance 134. The map definition 132 provides information on how to transform data attributes of the source data structure 112 to the destination data structure 122. In one embodiment, the map definition 132 may be defined by an extensible markup language (XML) data structure. Alternatively, the map definition 132 may be defined by a java file (.java) that is a byte code representation of the XML data structure and executable in a runtime environment. In further embodiments, the map definition 132 may be expressed in another type of data structure or format. One example of the map definition 132 is shown and described in more detail with reference to FIG. 2.

In one embodiment, the map instance 134 is a runtime instantiation of the map definition 132. Additionally, the map instance 134 may include transformation code associated with certain transformation actions included in the map definition 132. The map instance 134 may be used to perform the transformations described in the map definition 132. One example of a map instance 134 includes basic functionality such as logging, tracing, connections, and exception handling, as well as mapping content values from a source format to a destination format.

In one embodiment, the reverse map definition 136 is a compliment to the map definition 132. The reverse map definition 136 serves as a template of the reverse map instance 138 and includes information on how to transform data attributes of the destination data structure 122 to the source data structure 112. The reverse map definition 136 may be defined in an XML data structure, a java file (.java), or another type of data structure. Similarly, the reverse map instance 138 is a compliment to the map instance 134. The reverse map instance 138 may be used to perform the transformations described in the reverse map definition 136.

The illustrated data mapping system 100 also includes a system manager 129 and a mapping apparatus 130. The system manager 129 generally interacts with the interchange server 106 and the map apparatus 130. In particular, the system manager 129 facilitates proper placement of the map definition 132 and reverse map definition 136 in a location accessible by the interchange server 106. One example of the map apparatus 130 is shown and described in more detail with reference to FIG. 3.

The system manager 129 also facilitates access to a synonym table 140 by the map apparatus 130. In one embodiment, the synonym table 140 includes a list of synonyms for each of the attributes included in the source data structure 112. For example, if the source data structure 112 includes an attribute with an attribute identifier of "Name," then the synonym table 140 may include a listing of synonyms for "Name" which include "name," "fullname," "Full_Name," and so forth. The synonym table 140 may be expressed in XML format or in another format or data structure.

The map apparatus 130 also accesses or facilitates selection of a tolerance parameter 142. In one embodiment, the tolerance parameter 142 may influence the sensitivity of a comparison to find a matching attribute from the source data structure 112 and the destination data structure 122. One or more tolerance parameters 142 may be used independently or together during a comparison scenario. Some exemplary tolerance parameters 142 include an affix parameter, a case sensitivity parameter, and a data type compatibility parameter. Other types of tolerance parameters 142 also may be used in place of or in addition to the tolerance parameters 142 listed herein. Furthermore, each of these tolerance parameters 142 may be specified as a global parameter or as a limited parameter. In one embodiment, a global parameter is a parameter that is established for all iterations of a matching process. A limited parameter may be a parameter that is established for a single iteration of a matching process.

In one embodiment, the affix parameter determines whether a comparison between a source attribute and a destination attribute will take into account a prefix or a suffix added to the destination attribute. For example, if the source attribute is "Name" and the destination attribute is "ORCL_Name," then the affix parameter may be specified to compensate for the prefix "ORCL_" included in the destination attribute. (The prefix "ORCL_" may be used, for example, to designate a destination environment 104 that is an Oracle environment.)

In one embodiment, the case sensitivity parameter determines whether a comparison between a source attribute and a destination attribute will take into account the capitalization of the letters within each attribute. For example, with the case sensitivity parameter enabled, the source attribute "Name" does not match the destination attribute "name." However, ignoring the case sensitivity may return a match for the comparison of "Name" and "name."

In one embodiment, the data type compatibility parameter determines whether a comparison between a source attribute and a destination attribute will take into account the data type of each attribute. For example, with the data type compatibility parameter enabled, the source attribute value "15" as a string does not match the destination attribute value "15" as an integer because the source attribute is a string data type and the destination attribute is an integer data type. However, ignoring the data type of the source and destination attributes may return a match for the comparison of the string "15" and the integer "15."

In a similar manner, the tolerance parameter 142 may include a synonym parameter that indicates whether or not synonyms will be used in the match determination for a source attribute and a destination attribute. In another embodiment, the use of synonyms in the comparison process may or may not depend on a synonym parameter.

Figure 2:
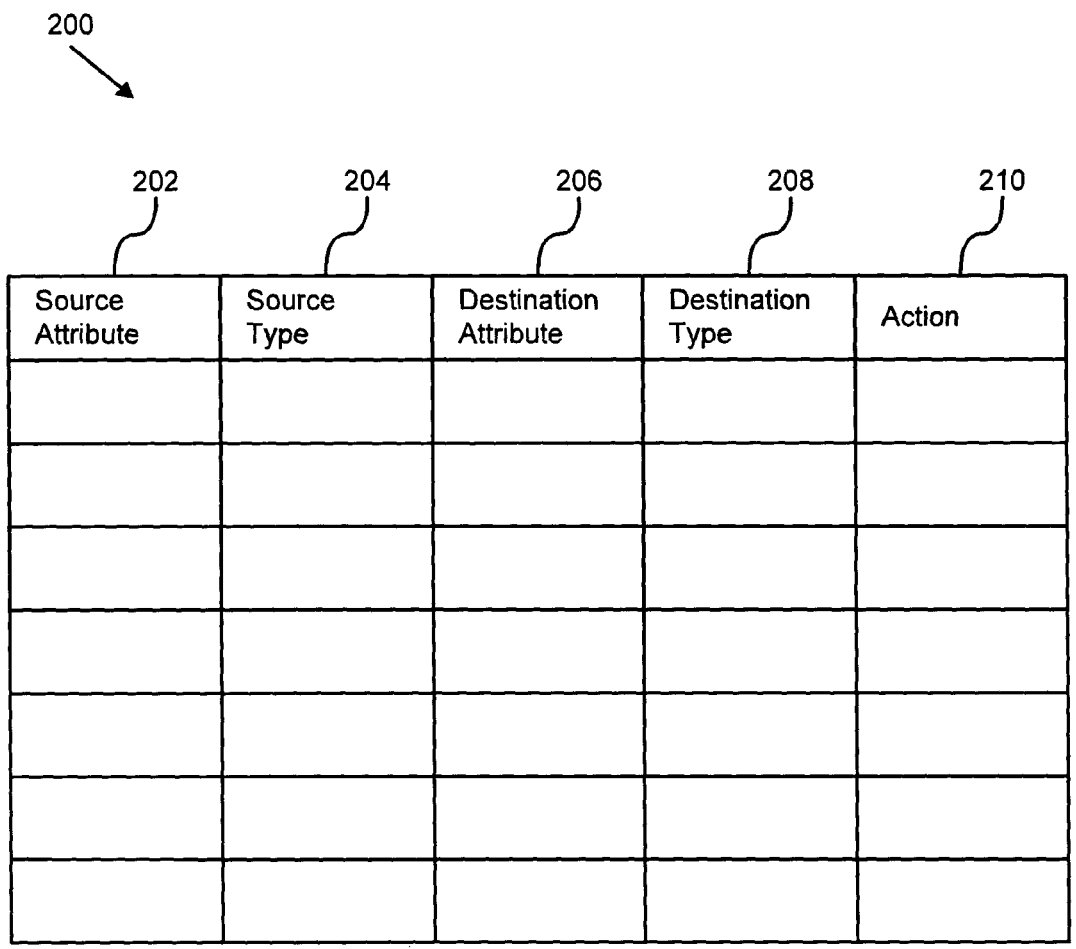
FIG. 2 is a schematic block diagram illustrating one embodiment of a map definition.

FIG. 2 depicts one embodiment of a map definition 200. Although the map definition 200 is illustrated in FIG. 2 as a single data structure, the map definition 200 may take alternative forms. For example, in one embodiment, the map definition 200 may include multiple intermediate map definitions that, when combined or employed in combination, serve to transform data from the source data structure 112 to the destination data structure 122. Some examples of such intermediate map definitions are an inbound map definition and an outbound map definition. The inbound map definition may transform the data from the source data structure 112 to a generic data structure. Similarly, the outbound map definition may transform the data from the generic data structure to the destination data structure 122.

In one embodiment, the map definition 200 provides information about the map instance 134. This information may include the name of the map instance 134, the name, attributes 202, and data types 204, of the source data structure 112, the name, attributes 206, and data types 208 of the destination data structure 122, the transformation actions 210 for each attribute match, and the name of the map definition 200. As used herein, the term "attribute" refers to a single entry within a data structure. Additionally, "attribute" or "attribute identifier" may be used to refer to a name for the data structure entry. For example, a single attribute entry within the source data structure 112 may include a name field, a type field, and a data field. The name field may include the attribute identifier, such as "Name." The type field may include a type indicator, such as "string," that identifies the type of data stored in the data field. The data field may include the data value, such as "John Smith," for the given attribute.

Alternative embodiments of the map definition 200 may include less or more information than the information listed here. As stated above, the map definition 200 provides information on how to transform attributes of one data structure to another. Therefore, in one embodiment, the name of the map definition 200 may identify the direction of the transformation and the data structure(s) it transforms.

The names of the source attributes 202 and destination attributes 206 included in the map definition 200 may include some or all of the attributes that may be transformed between the source and destination data structures 112, 122. In one embodiment, the map definition 200 includes the name identifiers of the source attributes 202 and destination attributes 206 that are automatically identified as matches via the map apparatus 130. Additionally, the map definition 200 may include the name identifiers of the source attributes 202 and destination attributes 206 that are manually identified as matches by a user or other matching technology.

The transformation actions 210 specify how a source attribute 202 may be transformed to a format compatible with the corresponding destination attribute 206. The transformation actions 210 may include standard and/or custom transformations. Some of the potential standard transformation actions that may be implemented via the map instance 134 include set value, move, join, split, submap, and cross-reference, which are outlined in the following table. Some of the potential custom transformation actions include content-based logic, date conversion, string conversion, etc.

When a clear correspondence exists between the source attribute 202 and the destination attribute 206, the transformation action 210 may simply move (copy) the source data value to the destination attribute 206. Other transformations may involve calculations, string manipulations, data type conversions, and any other logic that may be implemented using Java code or another transformation format.

TABLE 1

Standard Transformation Actions.

| Transformation Action | Description |
| --- | --- |
| Set Value | Specify a value for a destination attribute |
| Move (Copy) | Copy a source attribute to a destination attribute |
| Join | Join two or more source attributes into a single destination attribute |
| Split | Split a source attribute into two or more destination attributes |
| Submap | Call a map for a child (a subset) data structure |
| Cross-Reference | Maintain identity relationships for the data structures |

Figure 3:
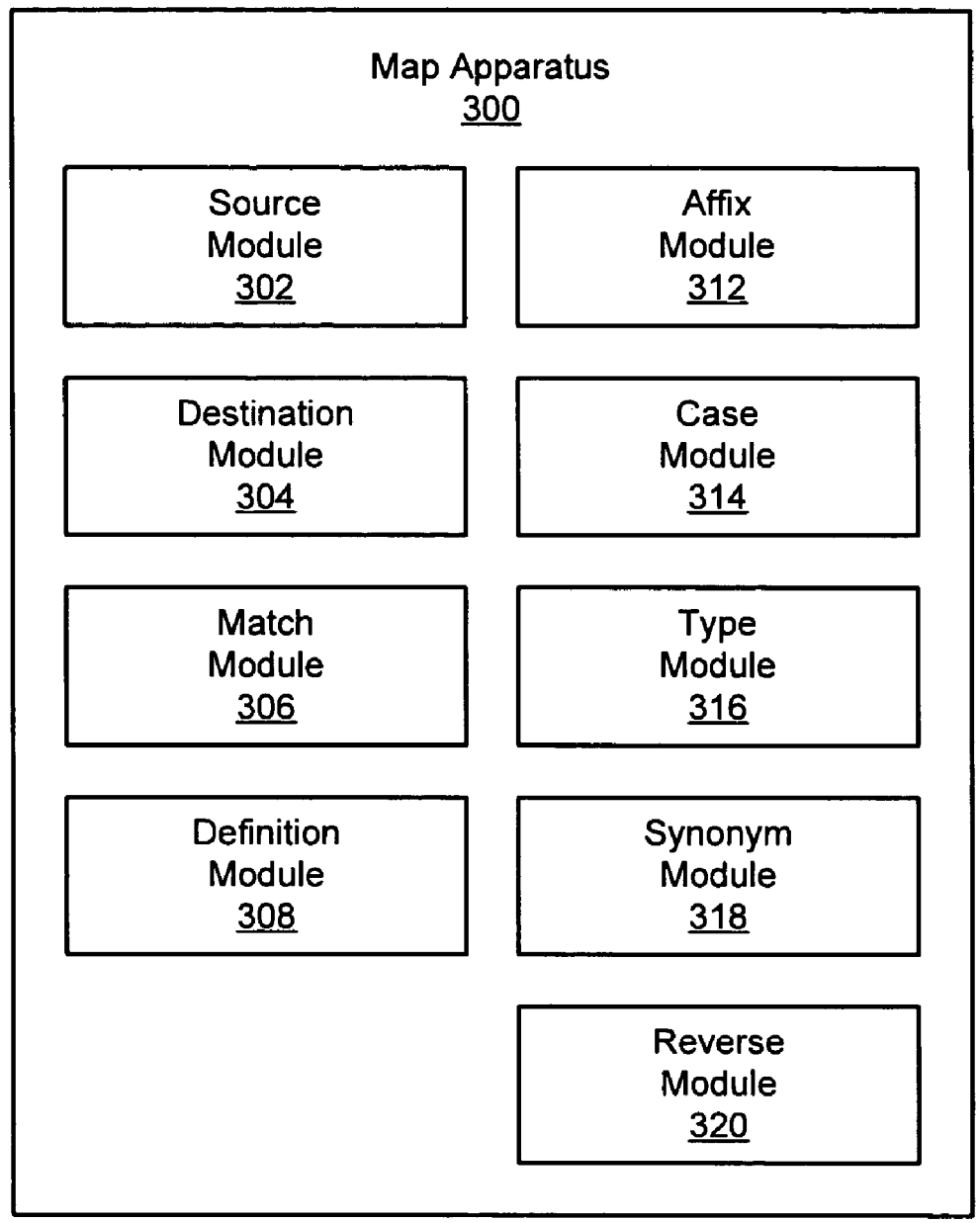
FIG. 3 is a schematic block diagram illustrating one embodiment of a map apparatus.

FIG. 3 depicts one embodiment of a map apparatus 300 that is substantially similar to the map apparatus 130 shown in FIG. 1. The illustrated map apparatus 300 includes a source module 302, a destination module 304, and a match module 306. The illustrated map apparatus 300 also includes a definition module 308, an affix module 312, a case module 314, a type module 316, a synonym module 318, and a reverse module 320.

In general, the map apparatus 300 determines the presence of similar names at the attribute level between a source data structure and 112 a destination data structure 122. The map apparatus 300 also automatically maps corresponding attributes, where possible, within the map definition 200.

Furthermore, the map apparatus 300 may employ comparison strategies that account for varying levels of sensitivity and compatibility. In this way, the map apparatus 300 is configured to map trivial attribute matches within the map definition 200 while allowing a user to augment the map definition 200 with additional matches of potentially greater complexity. In a case involving relatively simple data formats, the map apparatus 300 may map as much as 90%, for example, of the attributes of a source data structure 112 and a destination data structure 122. Unmapped attributes in the source data structure 112 may be related to attributes in the destination data structure 122 based on semantics rather than on matching identifiers.

In one embodiment, the source module 302 identifies a source data structure 112 and a source attribute 202 associated with the source data structure 112. In a particular embodiment, the source module 302 may identify a source data structure 112 by facilitating user selection of the source data structure 112. For example, the source module 302 may identify the source attribute 202 by the name value, also known as a source attribute identifier, within the source attribute 202.

In one embodiment, the destination module 304 identifies a destination data structure 122 and a destination attribute 206 associated with the destination data structure 122. In a particular embodiment, the destination module 304 may identify a destination data structure 122 by facilitating user selection of the destination data structure 122. For example, the destination module 304 may identify the destination attribute 206 by the name value, also known as a destination attribute identifier, within the destination attribute 206.

In one embodiment, the match module 306 automatically identifies a match of the source attribute 202 and the destination attribute 206. For example, the match module 306 may identify a match between a source attribute 202 with a name value (source attribute identifier) of "Name" and a destination attribute 206 with a name value (destination attribute identifier) of "Name." This match may be referred to as a trivial match because it can be identified by a simple comparison of the name values within the source attribute 202 and the destination attribute 206.

In a further embodiment, the match module 306 is also capable of identifying other types of trivial matches, including matches that may or may not take into account the capitalization of the attribute name values, the data type of the attribute name values, the use of prefixes and/or suffixes, and the use of synonyms. This flexibility allows the match module 306 to identify a majority of the trivial matches between the source data structure 112 and the destination data structure 122. For example, in the case of simple data formats, the match module 306 may identify as many as about 90% of the matching source attributes 202 and destination attributes 206.

In one embodiment, the definition module 308 generates a map definition 200 that includes the matches identified by the match module 306. Various embodiments and examples of map definitions 200 are shown and described in more detail with reference to FIG. 2. In another embodiment, the definition module 308 generates the map definition 200 during development time. Development time refers to a time during which the map definition 200 is created. In contrast to development time, runtime refers to a time approximately during which the data is being transformed and communicated between the source environment 102 and the destination environment 104. The map instance 134 is used for such runtime transformations. In contrast, the map definition 200 is generated prior to runtime. Therefore, in certain embodiments, development time may include any time that is prior to runtime.

In one embodiment, the affix module 312 designates an affix parameter. In particular, the affix module 312 may allow a user to designate the affix parameter as a tolerance parameter 142. The affix parameter may specify either a prefix or a suffix.

In one embodiment, the case module 314 designates a case sensitivity parameter. In particular, the case module 314 may allow a user to designate the case sensitivity parameter as the tolerance parameter 142. The case sensitivity parameter may specify whether or not capitalization of the source attribute 202 and destination attribute 206 matters for matching purposes.

In one embodiment, the type module 316 designates a data type compatibility parameter. In particular, the type module 316 may allow a user to designate the data type compatibility parameter as the tolerance parameter 142. The data type compatibility parameter may specify whether or not the data type compatibility of the source attribute 202 and the destination attribute 206 matters for matching purposes.

In one embodiment, the synonym module 318 allows a user to designate whether or not the match module 306 considers synonyms in identifying a match between the source attribute 202 and the destination attribute 206. Additionally, the synonym module 318 allows a user to create and store the synonym table 140, as described above with reference to FIG. 1.

In one embodiment, the reverse module 320 generates a reverse map definition 136 based on the map definition 200. (The map definition 200 also may be referred to as a forward map definition 200, in contrast to the reverse map definition 136.) In one embodiment, the reverse map definition 136 includes the same source attributes 202 and destination attributes 206 as the forward map definition 200. However, the transformation actions 210 corresponding to each attribute pair is reversed in the reverse map definition 136.

The following table lists some of the typical reverse map transformations, although other transformation actions also may be used.

TABLE 2

Reverse Transformation Actions.

| Transformation Action | Reverse Transformation Action |
|---|---|
| Set Value | No mapping |
| Move (Copy) | Move (Copy) |
| Join | Split |
| Split | Join |
| Submap | Submap (if present) |
| Cross-Reference | No mapping |

Because data may flow in both directions within the data communication system 100, the reverse map definition facilitates data flow from the destination environment 104 to the source environment 102. In this way, the reverse module 320 performs several trivial operations that may not require human intervention to generate at least a partial reverse map definition 136. A user may subsequently augment the reverse map definition 136 with additional attribute pairs and/or reverse transformation actions.

Figure 4:
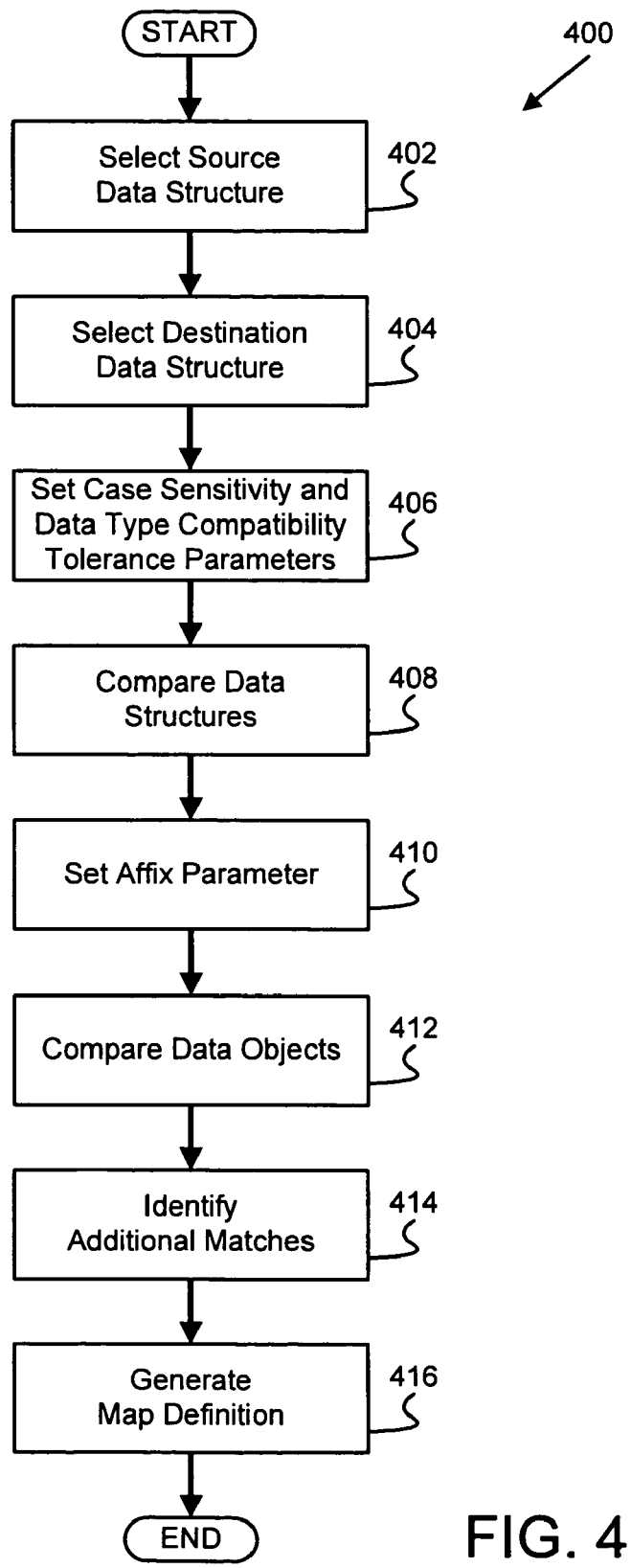
FIG. 4 is a schematic flow chart diagram illustrating one embodiment of a definition method.
Figure 5:
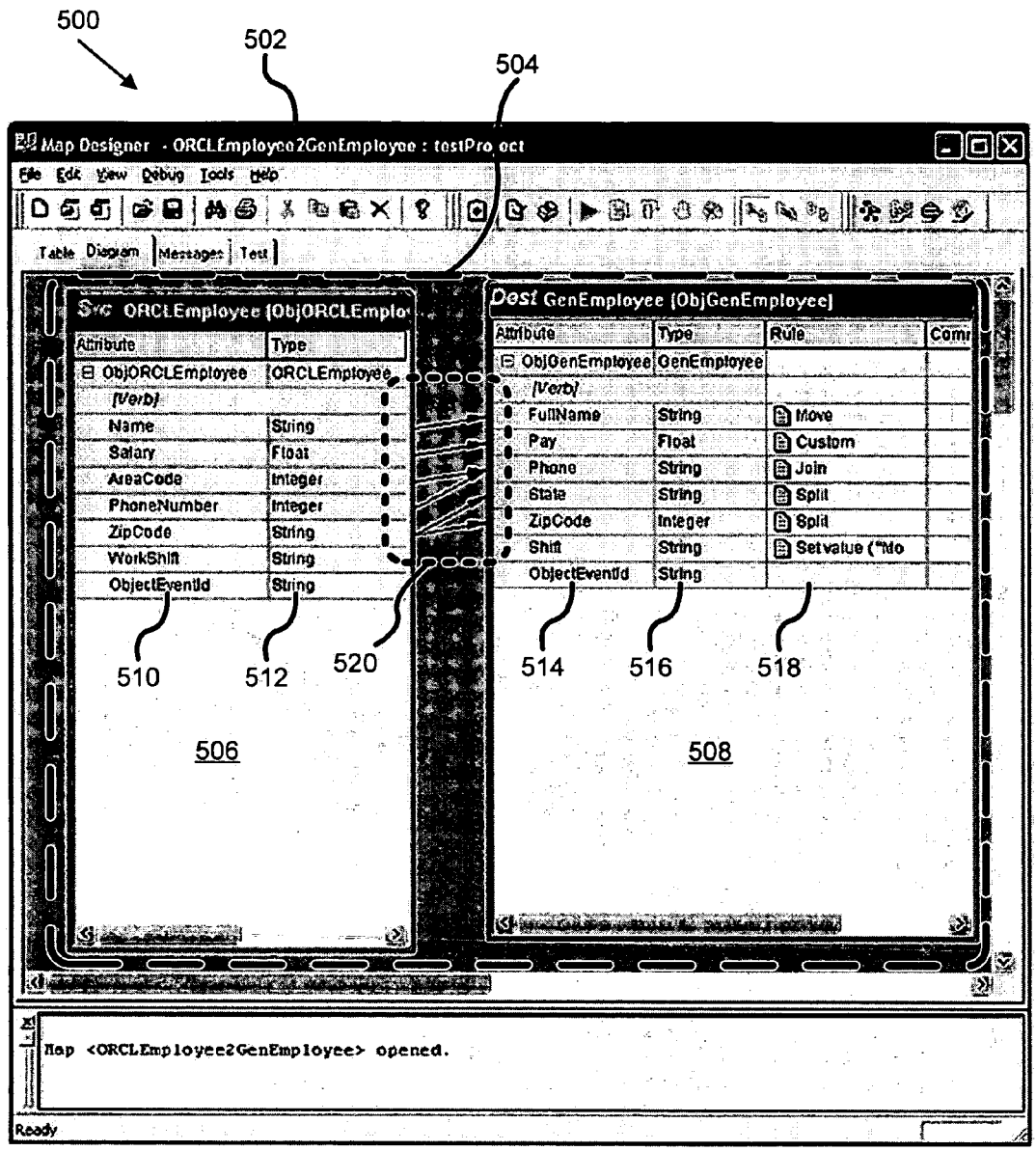
FIG. 5 is a schematic diagram illustrating one embodiment of a graphical user interface conveying a map definition.

FIG. 4 depicts one embodiment of a definition method 400 that may be implemented in conjunction with the map apparatus 300. The illustrated definition method 400 begins and the user selects 402 a source data structure 112. In one embodiment, the user employs the source module 302 to select 402 the source data structure 112. In another embodiment, the user may drag and drop a source data structure 112 into a graphical user interface (GUI), as shown in FIG. 5. Alternatively, the user may browse a file directory to find the desired source data structure 112. After selecting 402 a source data structure 112, the user selects 404 a destination data structure 122. In one embodiment, the user employs the destination module 304 to select 404 the destination data structure 122.

The user then sets 406 the case sensitivity parameter and the data type compatibility parameter. In one embodiment, these parameters may be global parameters for a mapping operation. The user may employ the case module 314 and the type module 316 to set 406 the case sensitivity parameter and the data type compatibility parameter, respectively. One example of a parameter selection interface that may be used to set 406 these parameters is shown and described in more detail with reference to FIG. 8.

Upon initiation of the matching process by the user, the match module 306 proceeds to compare 408 the source data structure 112 and the destination data structure 122. In particular, the match module 306 compares each of the source attributes 202 to each of the destination attributes 206 to find matching attribute pairs. In one embodiment, the matching attribute pairs may be identified by their name values. If the case sensitivity parameter is set to ignore the capitalization of the source attribute 202 and destination attribute 206 in a given comparison, then the match module 306 ignores capitalization. If the data type compatibility parameter is set to ignore the data types of the source attribute 202 and the destination attribute 206 in a given comparison, then the match module 306 ignores the data type. Any matching attribute pairs are added to the map definition 200.

The user then sets 410 the affix parameter. In one embodiment, the affix parameter may be a limited parameter, which is only used for a single comparison iteration and only if specified by the user. The user may employ the affix module 312 to set 410 the affix parameter. Setting the affix parameter, in one embodiment, includes specifying if a prefix or suffix is included in the destination data structure 122 and, if so, specifying the content of the prefix or suffix. One example of a parameter selection interface that may be used to set 410 the affix parameter is shown and described in more detail with reference to FIG. 6.

If the user elects to set the affix parameter, then the match module 306 compares 412 the source data structure 112 and the destination data structure 122 again, as described above, except using the affix parameter. Any matching attribute pairs that are found using the affix parameter are then added to the map definition 200. The match module 306 may subsequently perform additional comparisons to find additional matching attribute pairs using other parameters or techniques. In one embodiment, the match module 306 may attempt to identify matching attribute pairs that are characterized by the use of synonym name values. For example, the match module 306 may search within the destination data structure 122 for destination attributes 206 that are synonyms for the source attributes 202 within the source data structure 112. These synonyms may be included in the synonym table 140 described above.

After the match module 306 identifies all of the matching attribute pairs within the source data structure 112 and the destination data structure 122, the definition module 308 generates 414 the final map definition 200 from the automated definition method 400. However, even though the match module 306 may have identified a majority of the matching attribute pairs, the user may still augment the map definition 200 with additional matching attribute pairs that are not identified by the match module 306. One reason that the match module might fail to identify a matching attribute pair is the relatively complexity of the pair, such as where the matching attribute pair is not identifiable by using name matching or synonym matching techniques. After the definition module 308 generates 414 the map definition 200, the depicted definition method 400 ends.

FIG. 5 depicts one embodiment of a display system 500 having a graphical user interface 502 conveying a map definition 504. The display system 500 may be any type of computer display system. The map definition 504 is substantially similar to the map definition 200 shown in FIG. 2. The illustrated map definition 504 includes a source data structure 506 and a destination data structure 508.

The source data structure 506 includes a plurality of source attributes 510, each of which has a name value and an associated data type 512. Similarly, the destination data structure 508 includes a plurality of destination attributes 514, each of which has a name value and an associated data type 516. The map definition 504 also has a transformation action 518 associated with each matching attribute pair.

The matching attribute pairs are designated by the indicating arrows 520 that show which source attributes 510 are matched with each of the destination attributes 514. For example, the "Name" source attribute 510 matches the "FullName" destination attribute 514. The transformation action 518 associated with this particular attribute pair is the move operation. In one embodiment, the match module 306 may find this type of trivial match. In other embodiments, the match module 306 or a user may identify other types of matches used in the map definition 504.

Figure 6:
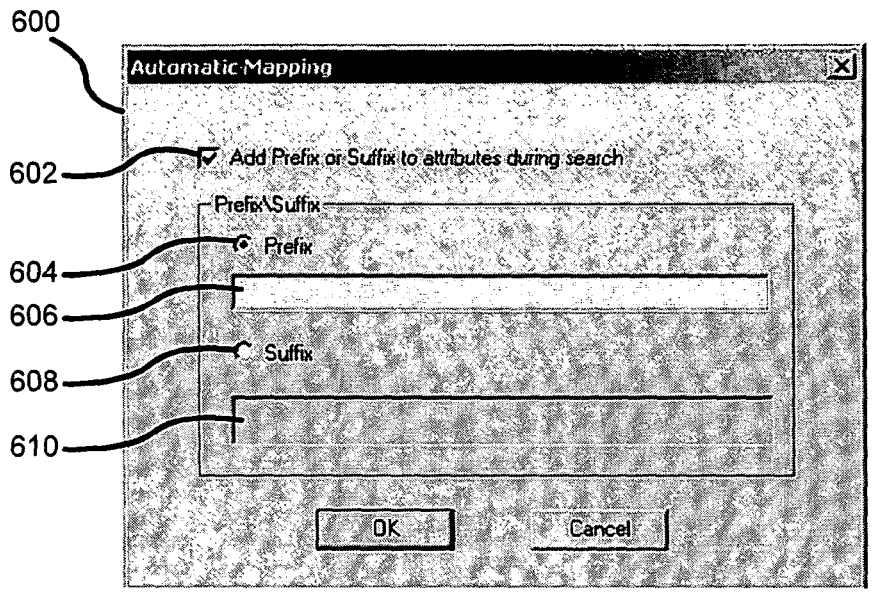
FIG. 6 is a schematic diagram illustrating one embodiment of a graphical user interface conveying an affix selection menu.

FIG. 6 depicts one embodiment of an affix selection menu 600 that may be conveyed by the display system 500 shown in FIG. 5. The illustrated affix selection menu 600 includes a parameter activation selector 602, a prefix selector 604, a prefix text box 606, a suffix selector 608, and a suffix text box 610. In one embodiment, the parameter activation selector 602 allows a user to activate or deactivate the affix parameter, in general. The prefix selector 604 allows a user to select a prefix to be used as the affix parameter. The user may enter a prefix value in the prefix text box 606. Similarly, the suffix selector 608 allows a user to select a suffix to be used as the affix parameter. The user may enter a suffix value in the suffix text box 610.

Figure 7:
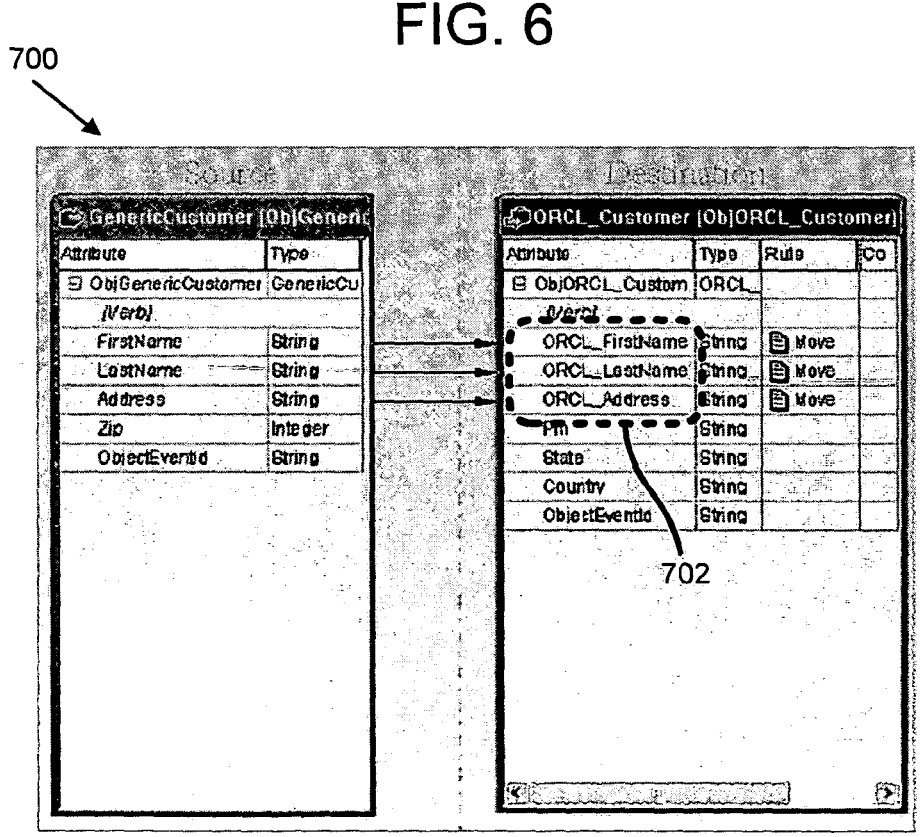
FIG. 7 is a schematic diagram illustrating one embodiment of a graphical user interface conveying a map definition implemented using an affix parameter.

FIG. 7 depicts one embodiment of a map definition 700 implemented using an affix parameter. The map definition 700 includes a plurality of destination attributes 702 that each has a name value which includes the prefix "ORCL_." These destination attributes 702 each belong to attribute matches, despite the presence of the "ORCL_" prefix. In one embodiment, the match module 306 may identify such matches by enabling the affix parameter having a prefix value of "ORCL_" so that "FirstName" and "ORCL_FirstName" are identified as a match.

Figure 8:
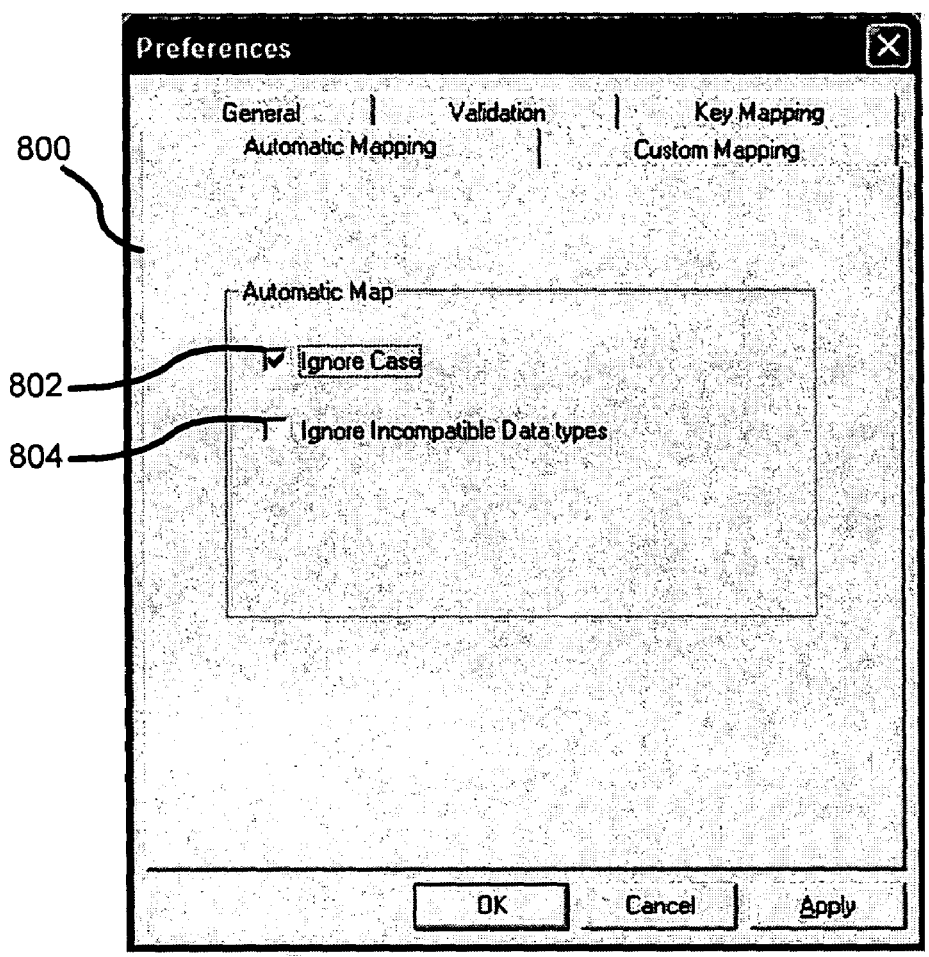
FIG. 8 is a schematic diagram illustrating one embodiment of a graphical user interface conveying a tolerance parameter menu.

FIG. 8 depicts one embodiment of a tolerance parameter menu 800 that may be conveyed by the display system 500 shown in FIG. 5. The illustrated tolerance parameter menu 800 includes a case sensitivity activation selector 802 and a data type compatibility activation selector 804. The case sensitivity selector 802 allows a user to activate (or deactivate, depending on the default state of the parameter) the case sensitivity parameter. Similarly, the data type compatibility selector 804 allows a user to activate (or deactivate) the data type compatibility parameter.

Figure 9:
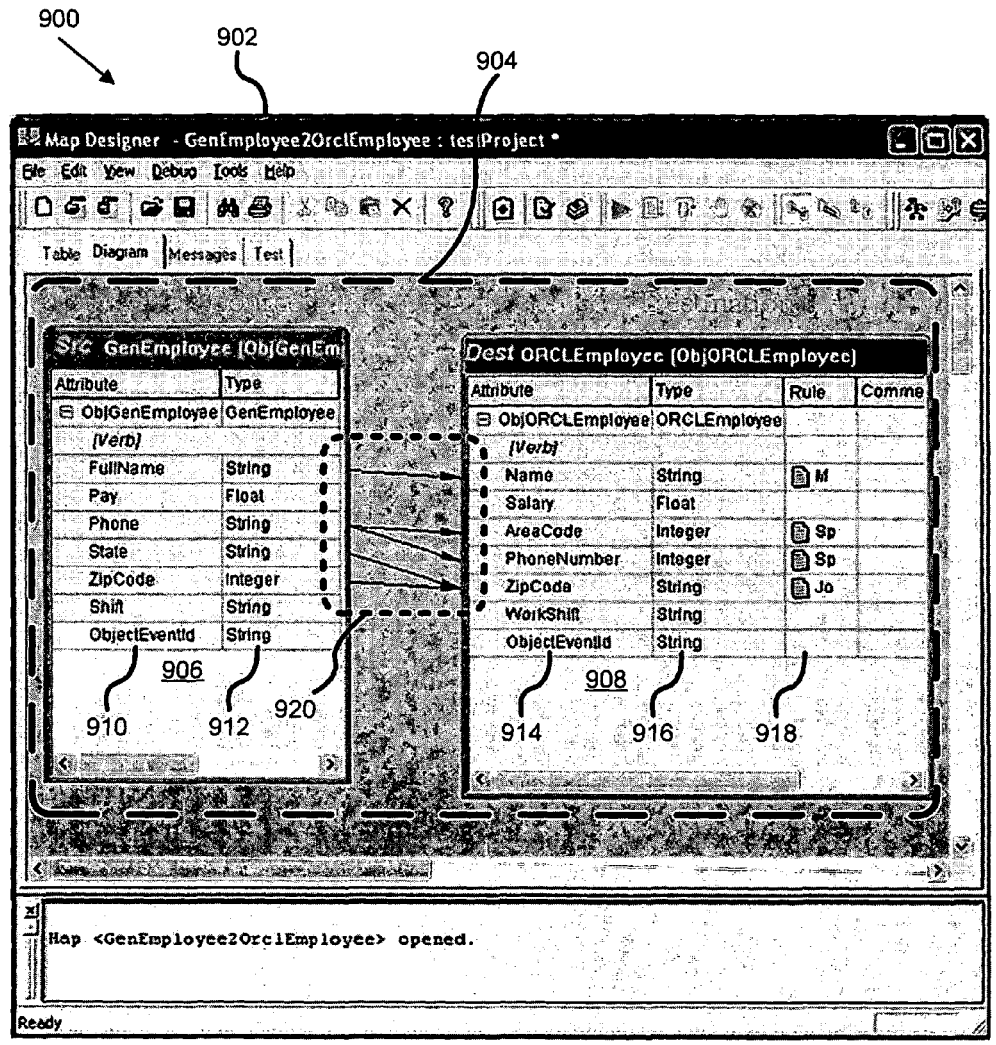
FIG. 9 is a schematic diagram illustrating one embodiment of a graphical user interface conveying a reverse map definition.

FIG. 9 depicts one embodiment of the display system 500 having a graphical user interface 902 conveying a reverse map definition 904. The reverse map definition 904 is related to the map definition 504 shown in FIG. 5. The illustrated reverse map definition 904 includes a source data structure 906 and a destination data structure 908. The source data structure 906 is the destination data structure 508 shown in FIG. 5. The destination data structure 908 is the source data structure 906 shown in FIG. 5. In other words, the data structures are reversed from the data structures in the map definition 504 in FIG. 5.

Each of the source attributes 910 has a name value and an associated data type 912. Similarly, each of the destination attributes 914 has a name value and an associated data type 916. The reverse map definition 904 also has a reverse transformation action 918 associated with each matching attribute pair.

The matching attribute pairs of the reverse map definition 904 are designated by the indicating arrows 920 that show which source attributes 910 are matched with each of the destination attributes 914. For example, the "FullName" source attribute 910 matches the "Name" destination attribute 914. The reverse transformation action 916 associated with this attribute pair is the move operation. In general, the reverse transformation actions 918 in the reverse map definition 904 are the reverse actions according to Table 2. In one embodiment, the reverse module 320 may generate the reverse map definition 904 based on the map definition 504.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating a storable map definition for a client, the method comprising:

accessing a source data structure and a destination data structure, wherein the source data structure comprises a plurality of source attributes and the destination data structure comprises a plurality of destination attributes;

using a map apparatus to automatically identify a match of an identified source attribute and an identified destination attribute, the map apparatus implemented on a processor and a memory, the match identified according to predefined tolerance parameters comprising affixes, case sensitivities, data types, and synonyms, and using the map apparatus to generate a storable map definition configured to map a source value for the identified source attribute to a destination value for the identified destination attribute;

delivering the storable map definition to a user, the storable map definition comprising the identified source attribute, the identified destination attribute, and a transformation action associated with each identified source attribute and identified destination attribute, the transformation action configured to transform data in the identified source attribute of the source data structure to data in the identified destination attribute of the destination data structure, the source data structure and the destination data structure residing on disparate data systems, wherein the transformation action specifies an action to convert at least one data value in the identified source attribute to one or more data values in data fields of the identified destination attribute;

using the map apparatus to generate a storable reverse map definition from a mapping defined in the storable map definition;

using the map apparatus to automatically generate a reverse transformation action for the storable reverse map definition, the reverse transformation action based on a transformation action included in the storable map definition, the reverse transformation action specifying an action to convert at least one data value in the identified destination attribute to one or more data values in data fields of the identified source attribute; and delivering the storable reverse map definition to the user.

2. The method of claim 1, further comprising generating the storable map definition during a development time.

3. The method of claim 1, wherein the automatic identification comprises comparing the spelling of a source attribute identifier to the spelling of a destination attribute identifier.

4. The method of claim 1, further comprising editing the storable map definition to define a mapping between an additional source attribute and an additional destination attribute in response to the user augmenting the storable map definition, the additional source and destination attributes having a semantic relationship.

5. The method of claim 1, further comprising instantiating the storable map definition at runtime as a map instance, the map instance comprising transformation code associated with a transformation action included in the storable map definition.

6. The method of claim 1, wherein the storable map definition is defined by a Java file comprising a representation of an Extensible Markup Language ("XML") data structure.

7. A computer program product comprising a computer readable storage medium tangibly embodying a program of machine-readable instructions executable by a digital processing apparatus to perform operations to facilitate automatic generation of a storable map definition, the operations of the computer program product comprising:

accessing a source data structure and a destination data structure, wherein the source data structure comprises a plurality of source attributes and the destination data structure comprises a plurality of destination attributes;

automatically identifying a match of an identified source attribute and an identified destination attribute using a map apparatus implemented on a processor and a memory, the match identified according to predefined tolerance parameters comprising affixes, case sensitivities, data types and synonyms;

generating a storable map definition inclusive of the match and delivering the storable map definition to a user, the storable map definition comprising the identified source attribute, the identified destination attribute, and a transformation action associated with each identified source attribute and identified destination attribute, the transformation action configured to transform data in the identified source attribute of the source data structure to data in the identified destination attribute of the destination data structure, the source data structure and the destination data structure residing on disparate data systems, wherein the transformation action specifies an action to convert at least one data value in the identified source attribute to one or more data values in data fields of the identified destination attribute;

editing the storable map definition to define a mapping between an additional source attribute and an additional destination attribute in response to the user augmenting the storable map definition, the additional source and destination attributes having a semantic relationship;

generating a storable reverse map definition from a mapping defined in the storable map definition;

automatically generating a reverse transformation action for the storable reverse map definition, the reverse transformation action based on a transformation action included in the storable map definition, the reverse transformation action specifying an action to convert at least one data value in the identified destination attribute to one or more data values in data fields of the identified source attribute; and delivering the storable reverse map definition to the user.

8. The computer program product of claim 7, wherein the instructions further comprise an operation to generate the storable map definition during development time.

9. The computer program product of claim 7, wherein the predefined tolerance parameters comprise a data type compatibility parameter and the instructions further comprise an operation to designate the data type compatibility parameter.

10. The computer program product of claim 7, wherein the reverse transformation action comprises a join operation and the transformation action comprises a split operation.

11. The computer program product of claim 7, wherein the reverse transformation action comprises a split operation and the transformation action comprises a join operation.

12. The computer program product of claim 7, wherein the instructions further comprise an operation to generate a compiled reverse map definition from the storable reverse map definition.

13. The computer program product of claim 7, wherein the source data structure comprises a source attribute identifier and the destination data structure comprises a destination attribute identifier and wherein the instructions further comprise an operation to identify the match according to a comparison of the destination attribute identifier and a synonym of the source attribute identifier.

14. The computer program product of claim 13, wherein the instructions further comprise an operation to search a synonym table for the synonym.

15. The computer program product of claim 7, wherein the instructions further comprise an operation to generate a compiled map definition from the storable map definition, wherein the compiled map definition comprises transformation code associated with one or more transformation actions included in the storable map definition, the transformation code executable in a runtime environment.

16. An apparatus comprising the computer program product of claim 7, wherein the apparatus further comprises a plurality of modules configured to implement the operations to facilitate automatic generation of the storable map definition.

17. A system comprising the computer program product of claim 7, wherein the system further comprises an interchange server coupled to the source data structure and the destination data structure.

18. The system of claim 17, further comprising a source database server coupled to the interchange server, wherein the source data structure resides on the source database server.

19. The system of claim 17, further comprising a destination database server coupled to the interchange server, wherein the destination data structure resides on the destination database server.

20. The system of claim 17, further comprising an electronic memory device coupled to the interchange server, wherein the electronic memory device is configured to store the machine-readable instructions of the computer readable storage medium.

21. The system of claim 20, further comprising a synonym table stored on the electronic memory device, the synonym table comprising one or more synonyms associated with a source attribute identifier.

22. The system of claim 17, further comprising a digital processor configured to execute the machine-readable instructions of the computer readable storage medium to perform the operations to facilitate automatic generation of the storable map definition.

23. The computer program product of claim 7, wherein the instructions further comprise an operation to instantiate the storable map definition at runtime as a map instance, the map instance comprising transformation code associated with a transformation action included in the storable map definition.

24. The computer program product of claim 7, wherein the storable map definition is defined by a Java file comprising a representation of an Extensible Markup Language ("XML") data structure.

25. A method for automatically generating a storable map definition, the method comprising:

identifying a source data structure and a plurality of source attributes associated with the source data structure;

identifying a destination data structure and a plurality of destination attributes associated with the destination data structure;

automatically identifying a match of an identified source attribute and an identified destination attribute using a map apparatus implemented on a processor and a memory, the match identified according to predefined tolerance parameters comprising affixes, case sensitivities, data types and synonyms;

generating a storable map definition inclusive of the match and delivering the storable map definition to the user, the storable map definition comprising the identified source attribute, the identified destination attribute, and a transformation action associated with each identified source attribute and identified destination attribute, the transformation action configured to transform data in the identified source data attribute of the source data structure to data in the identified destination data attribute of the destination data structure, the source data structure and the destination data structure residing on disparate data systems, wherein the transformation action specifies one of a move, join, split, submap, cross-reference, string manipulation, and data type conversion;

editing the storable map definition to define a mapping between an additional source attribute and an additional destination attribute in response to the user augmenting the storable map definition, the additional source attribute and the additional destination attribute having a semantic relationship;

generating a storable reverse map definition from a mapping defined in the storable map definition;

automatically generating a reverse transformation action for the storable reverse map definition, the reverse transformation action based on a transformation action included in the storable map definition, the reverse transformation action specifying an action to convert at least one data value in the identified destination attribute to one or more data values in data fields of the identified source attribute; and delivering the storable reverse map definition to the user.

26. The method of claim 25, further comprising generating the storable map definition during development time.

27. The method of claim 25, wherein the predefined tolerance parameters comprise a data type compatibility parameter.

28. The method of claim 25, further comprising comparing the identified destination attribute and a synonym associated with the identified source attribute.

29. The method of claim 25, further comprising instantiating the storable map definition at runtime as a map instance, the map instance comprising transformation code associated with a transformation action included in the storable map definition.

30. The method of claim 25, wherein the storable map definition is defined by a Java file comprising a representation of an Extensible Markup Language ("XML") data structure.

* * * * *